United States Patent
Blais et al.

(10) Patent No.: US 11,989,114 B2
(45) Date of Patent: May 21, 2024

(54) VALIDATION OF INSPECTION SOFTWARE

(71) Applicant: PRATT & WHITNEY CANADA CORP., Longueuil (CA)

(72) Inventors: Mario Blais, Varennes (CA); Clement Drouin Laberge, Terrebonne (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 152 days.

(21) Appl. No.: 16/529,875

(22) Filed: Aug. 2, 2019

(65) Prior Publication Data
US 2021/0034504 A1 Feb. 4, 2021

(51) Int. Cl.
G06F 11/00 (2006.01)
G06F 11/36 (2006.01)

(52) U.S. Cl.
CPC ...... *G06F 11/3664* (2013.01); *G06F 11/3608* (2013.01)

(58) Field of Classification Search
CPC .. G06F 11/3664; G06F 11/3668; G06F 11/36; G06F 11/3604; G06F 11/3608; G06F 11/3612; G06F 11/3616; G06F 11/3672; G06F 11/3676; G06F 11/3692; G01B 11/30; G01C 15/00; G06T 7/0004; G06T 7/74; G06T 7/0002; G06T 7/001; G05B 23/0221; G05B 23/0267; G05B 23/027; G05B 23/0272; G05B 23/0297; G05B 19/0428
See application file for complete search history.

(56) References Cited

U.S. PATENT DOCUMENTS

| | | | | |
|---|---|---|---|---|
| 6,466,895 B1 * | 10/2002 | Harvey | ...... | H01L 22/20 |
| | | | | 850/62 |
| 8,131,055 B2 * | 3/2012 | Clarke | ...... | G05B 19/41875 |
| | | | | 382/141 |
| 2017/0212500 A1 * | 7/2017 | Dostert | ...... | G05B 19/4065 |
| 2017/0249729 A1 * | 8/2017 | Greene | ...... | G06T 7/001 |

FOREIGN PATENT DOCUMENTS

JP   8219999 A   8/1996

OTHER PUBLICATIONS

Brosed, Francisco Javier, Juan José Aguilar, David Guillomía, and Jorge Santolaria. "3D geometrical inspection of complex geometry parts using a novel laser triangulation sensor and a robot." Sensors 11, No. 1 (2010): 90-110. (Year: 2010).*

(Continued)

*Primary Examiner* — Christopher S McCarthy
(74) *Attorney, Agent, or Firm* — Norton Rose Fulbright Canada LLP (57) ABSTRACT

Systems and methods for validating an inspection software are provided. A dataset which defines properties for a three-dimensional component having at least one known defect is obtained. The three-dimensional component is inspected with the inspection software using the dataset to obtain inspection results for the three-dimensional component. The inspection results are compared to reference results for the three-dimensional component. When the inspection results correspond to the reference results within a predetermined threshold, a signal indicative of validation of the inspection software is issued.

16 Claims, 4 Drawing Sheets

(56) References Cited

OTHER PUBLICATIONS

Rao, Prahalad K., Zhenyu Kong, Chad E. Duty, Rachel J. Smith, Vlastimil Kunc, and Lonnie J. Love. "Assessment of dimensional integrity and spatial defect localization in additive manufacturing using spectral graph theory." Journal of Manufacturing Science and Engineering 138, No. 5 (2016). (Year: 2016).*
Bernard, Alain. "Reverse engineering for rapid product development: a state of the art." Three-Dimensional Imaging, Optical Metrology, and Inspection V 3835 (1999): 50-63. (Year: 1999).*
Su, L-S., Thomas E. Wohr, and James J. Leybourne. "Automatic pattern inspection for multilayer ceramic package." In Proceedings., 39th Electronic Components Conference, pp. 616-622. IEEE, 1969. (Year: 1969).*
Bradley, C., and S. Kurada. "Industrial inspection employing a three dimensional vision system and a neural network classifier." In IEEE Pacific Rim Conference on Communications, Computers, and Signal Processing. Proceedings, pp. 505-508. IEEE, 1995. (Year: 1995).*
Google Scholar/Patents search—text refined (Year: 2024).*

* cited by examiner

VALIDATION OF INSPECTION SOFTWARE

TECHNICAL FIELD

The present disclosure relates generally to inspection software, and more particularly to validation of inspection software.

BACKGROUND OF THE ART

Inspection tools of various types are used in manufacturing and production settings for ensuring quality and suitability of components for use in assembly of products, delivery of services, and the like. Inspection tools can rely on various mechanical, optical, electrical, and/or magnetic principles to inspect components.

Some inspection tools include inspection software, which can be used to analyze the results of inspection procedures. Ensuring accurate measurements requires validation of the inspection tool, including the inspection software.

Therefore, improvements are needed.

SUMMARY

In accordance with at least one broad aspect, there is provided a method for validating an inspection software are provided. A dataset which defines properties for a three-dimensional component having at least one known defect is obtained. The three-dimensional component is inspected with the inspection software using the dataset to obtain inspection results for the three-dimensional component. The inspection results are compared to reference results for the three-dimensional component. When the inspection results correspond to the reference results within a predetermined threshold, a signal indicative of validation of the inspection software is issued.

In accordance with at least one other broad aspect, there is provided a system for validating an inspection tool, comprising: a processing unit; and a non-transitory computer-readable memory communicatively coupled to the processing unit and comprising computer-readable program instructions. The program instructions are executable by the processing unit for: obtaining a dataset which defines properties for a three-dimensional component having at least one known defect; inspecting the three-dimensional component with the inspection software using the dataset to obtain inspection results for the three-dimensional component; comparing the inspection results to reference results for the three-dimensional component; and when the inspection results correspond to the reference results within a predetermined threshold, issuing a signal indicative of validation of the inspection software.

Features of the systems, devices, and methods described herein may be used in various combinations, in accordance with the embodiments described herein.

DESCRIPTION OF THE DRAWINGS

Reference is now made to the accompanying figures in which.

It will be noted that throughout the appended drawings, like features are identified by like reference numerals.

DETAILED DESCRIPTION

Herein described are methods and systems for validating inspection software, for instance as used within inspection tools. The present disclosure considers various types of inspection tools. In some embodiments, the inspection tools include mechanical inspection devices, for instance calipers, scales, gauges, levels, ultrasound scanners, and the like, to produce measurements regarding properties of components. In some other embodiments, the inspection tools include optical inspection devices, which make use of laser-based scanners, infra-red scanners, and/or other scanning devices, to produce measurements regarding properties of the components. For example, scanning devices can be used to measure the dimensions of a particular component. Other types of inspection tools are also considered.

Inspection software can be used as part of the inspection tools to automate part or all of the analysis of the measurements produced by the inspection devices. Measurements obtained from the inspection devices can be provided to inspection software, which can then perform various tests and/or analytical procedures on the measurements to determine whether the component, as measured, meets requirements and/or conforms to pre-established standards. However, if the inspection software is not properly calibrated, or is defective in any other fashion, the results of the analysis performed by the inspection software can be misleading or inaccurate.

Figure 1:
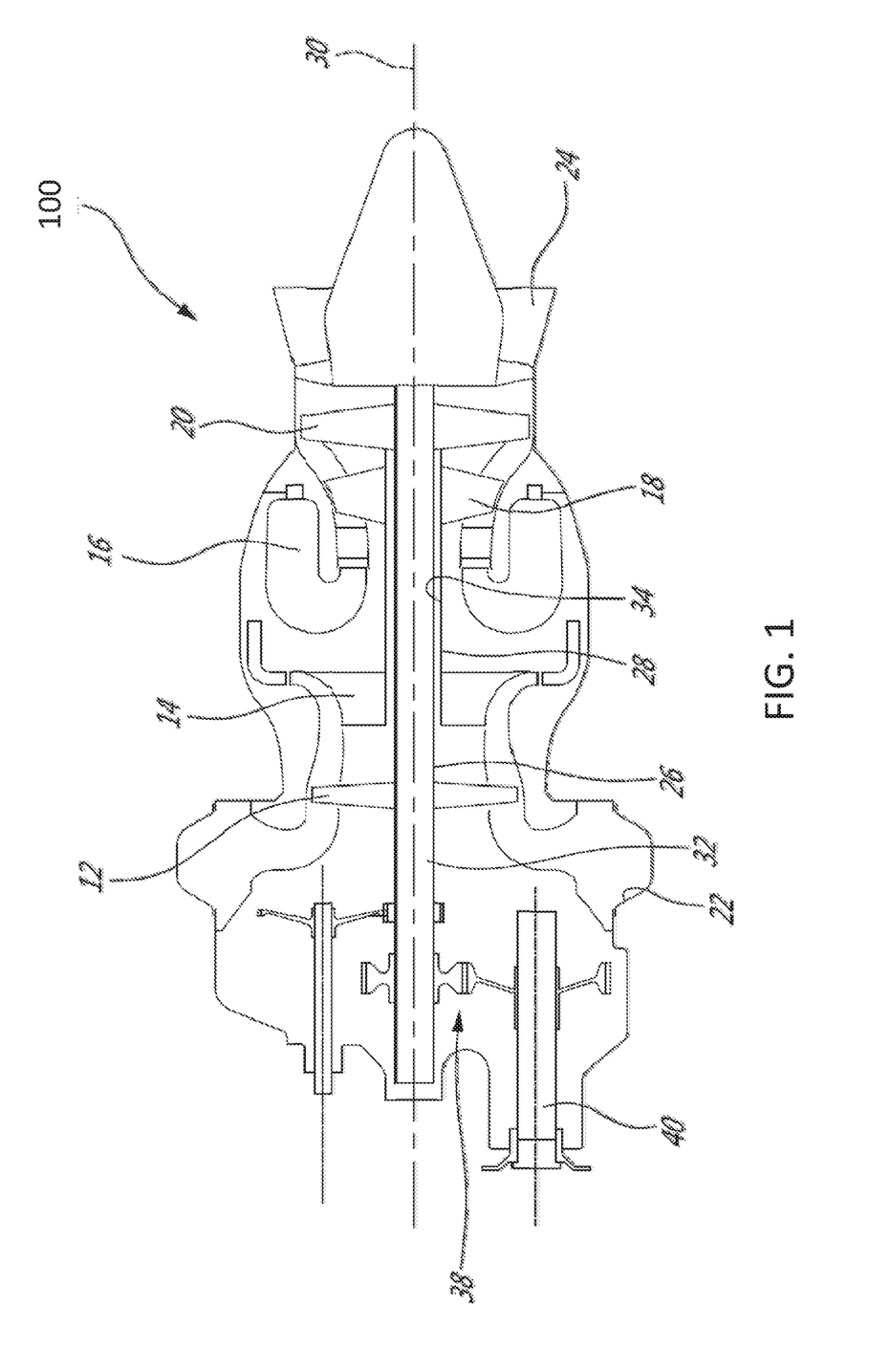
FIG. 1 is a cross-sectional view of an example turboshaft engine of an aircraft.

For context, and with reference to FIG. 1, a gas turbine engine 100 is shown. In this example, the engine 102 is a turboshaft engine generally comprising in serial flow communication a low pressure (LP) compressor section 12 and a high pressure (HP) compressor section 14 for pressurizing air, a combustor 16 in which the compressed air is mixed with fuel and ignited for generating an annular stream of hot combustion gases, a high pressure turbine section 18 for extracting energy from the combustion gases and driving the high pressure compressor section 14, and a lower pressure turbine section 20 for further extracting energy from the combustion gases and driving at least the low pressure compressor section 12.

The low pressure compressor section 12 may independently rotate from the high pressure compressor section 14. The low pressure compressor section 12 may include one or more compression stages and the high pressure compressor section 14 may include one or more compression stages. A compressor stage may include a compressor rotor, or a combination of the compressor rotor and a compressor stator assembly. In a multistage compressor configuration, the compressor stator assemblies may direct the air from one compressor rotor to the next.

The engine 102 has multiple, i.e. two or more, spools which may perform the compression to pressurize the air received through an air inlet 22, and which extract energy from the combustion gases before they exit via an exhaust outlet 24. In the illustrated embodiment, the engine 102 includes a low pressure spool 26 and a high pressure spool 28 mounted for rotation about an engine axis 30. The low pressure and high pressure spools 26, 28 are independently rotatable relative to each other about the axis 30. The term "spool" is herein intended to broadly refer to drivingly connected turbine and compressor rotors.

The low pressure spool 26 includes a low pressure shaft 32 interconnecting the low pressure turbine section 20 with the low pressure compressor section 12 to drive rotors of the low pressure compressor section 12. In other words, the low pressure compressor section 12 may include at least one low pressure compressor rotor directly drivingly engaged to the low pressure shaft 32 and the low pressure turbine section 20 may include at least one low pressure turbine rotor directly drivingly engaged to the low pressure shaft 32 so as to rotate the low pressure compressor section 12 at a same speed as the low pressure turbine section 20. The high pressure spool 28 includes a high pressure shaft 34 interconnecting the high pressure turbine section 18 with the high pressure compressor section 14 to drive rotors of the high pressure compressor section 14. In other words, the high pressure compressor section 14 may include at least one high pressure compressor rotor directly drivingly engaged to the high pressure shaft 34 and the high pressure turbine section 18 may include at least one high pressure turbine rotor directly drivingly engaged to the high pressure shaft 34 so as to rotate the high pressure compressor section 14 at a same speed as the high pressure turbine section 18. In some embodiments, the high pressure shaft 34 may be hollow and the low pressure shaft 32 extends therethrough. The two shafts 32, 34 are free to rotate independently from one another.

The engine 102 may include a transmission 38 driven by the low pressure shaft 32 and driving a rotatable output shaft 40. The transmission 38 may vary a ratio between rotational speeds of the low pressure shaft 32 and the output shaft 40.

The gas turbine engine 100 is composed of a plurality of different components, each of which can be required to conform to one or more standards. In some embodiments, the standards are established by the manufacturer of the components, or of the gas turbine engine 100. In some other embodiments, the standards are established by a regulatory agency, for instance in accordance with safety requirements or the like. The standards can dictate values for one or more properties of the components, including length, width, height, thickness, gap, planarity and/or waviness, angle (absolute and/or relative), curvature (including regarding radius, diameter, circumference, arc length, etc.), and the like.

Although the present disclosure discusses inspection techniques, including systems and methods for validating inspection software, in the context of components for an engine, for instance the gas turbine engine 100, it should be noted that the techniques described herein are applicable in other contexts.

Figure 2:
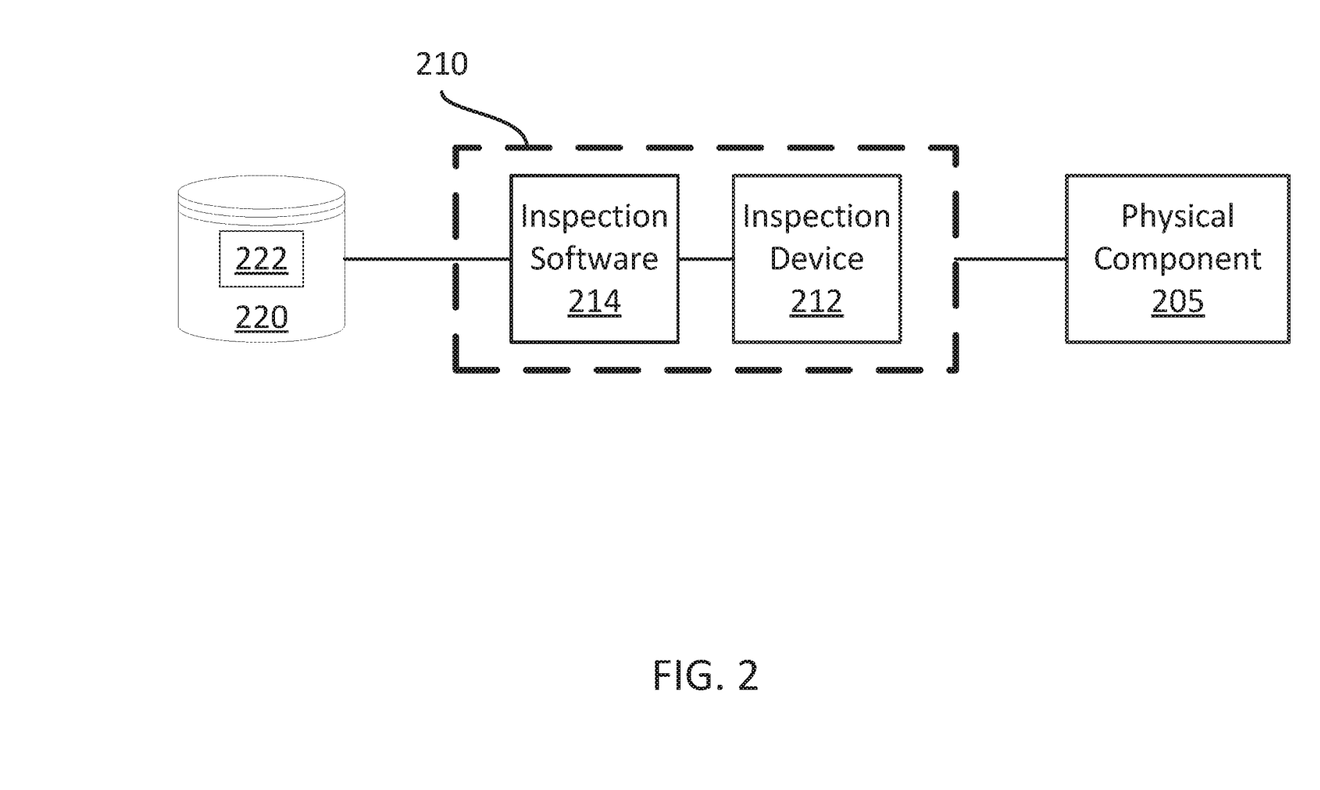
FIG. 2 is a block diagram of an example inspection tool.

With reference to FIG. 2, there is shown an inspection tool 210 which can be used to perform inspection of components, for instance a physical component 205 of the gas turbine engine 100. The physical component 205 can be any suitable component, and can be inspected in a variety of ways, using any suitable inspection tool 210. The inspection tool 210 can be configured for assessing any one or more properties of the physical component 205.

The inspection tool 210 is composed of an inspection device 212 and an inspection software 214. In some embodiments, the inspection tool 210 also includes a computing device which executes the inspection software 214. The inspection device 212 is the portion of the inspection tool 210 which performs the physical measurement on the physical component 205, and can include mechanical, optical, acoustic, or other means for performing a measurement on the physical component 205. The inspection device 212 produces a dataset composed of information regarding the measurement, for example measured values, which can then be provided to the inspection software 214. In some embodiments, the inspection device 212 produces a dataset on a screen or display of the inspection device 212, and an operator of the inspection system 210 can record the values of the dataset manually and provide the dataset to the inspection software 214 via an input device, such as a keyboard or the like. In other embodiments, the inspection device 212 can gather the dataset and provide it to the inspection software 214 via one or more communication paths, which can be wired and/or wireless, and using any suitable communication protocols.

The inspection software 214 is configured for obtaining the dataset produced by the inspection device 212, whether from the inspection device 212 itself or via operator input. Based on the dataset, the inspection software 214 can perform one or more tests and/or analytical procedures on the measurement obtained from the inspection device 212 to produce inspection results. For example, the inspection software 214 can compare the measurement for the physical component 205 to determine whether the physical component 205, as measured, conforms to certain pre-established standards and/or meets certain predetermined requirements.

In some embodiments, the inspection software 214 compares the properties of the physical component 205, or properties of one or more portions of the physical component 205, to established standards for the properties. For example, the radius of a circular portion of the physical component 205 can be measured as being 10 cm by the inspection device 212, and the inspection software 214 can compare the 10 cm value to an established standard for the physical component 205. In some other embodiments, the inspection software 214 compares a contour or perimeter of the physical component 205, or portions thereof, to an established contour or perimeter, for instance based on plans or a model for the physical component 205. For example, a point cloud representative of the contour of the physical component 205 can be acquired. In some further embodiments, the inspection software 214 compares other properties of the physical component 205, as measured by the inspection device 212, to established standards therefor. Cases in which the properties of the physical component 205 deviate from the established standards may be termed "defects", and be reflected in the inspection results produced by the inspection software 214.

In certain cases, the inspection software 214 may fail to notice certain defects in the physical component 205, or may conversely identify defects in the physical component 205 which are not present in actuality. These faults in the inspection software 214 can produce incorrect inspection results for the physical component 205: in cases in which the physical component 205 contains defects, the faulty inspection software 214 may mark the physical component 205 as satisfactory; alternatively, in cases in which the physical component 205 does not contain defects, the faulty inspection software 214 may mark the physical component 205 as unsatisfactory. In addition, it may be desirable to validate the inspection software 214 following updates thereto, when installing the inspection software 214 on a new inspection tool 210, periodically, or in other cases, as appropriate.

In order to validate the inspection software 214, a reference dataset 222 for a component, for instance a virtual component, is used. In other embodiments, the reference dataset 222 is for a physical component, for instance the physical component 205—for ease of reference, the following discussion will refer to a virtual component, but it should be understood that a reference dataset 222 for a physical component is also considered.

The reference dataset 222 can be stored in any suitable data repository, for instance within the inspection tool 210 itself, or within a database 220 communicatively coupled thereto. The database 220 can be locally accessible to the inspection software 214, or can be remotely accessible via any suitable network, which can include any suitable number of wired and/or wireless communication paths.

The reference dataset 222 is composed of one or more measurements which correspond to measurements which would have been acquired, for instance by the inspection device 212, if the virtual component were instead a physical component, for instance the physical component 205. In this fashion, the reference dataset 222 defines one or more properties for the virtual component, which is three-dimensional and of any suitable shape and size. In some embodiments, the virtual component is based on a model for the physical component 205. In some other embodiments, the virtual component is composed of models for one or more physical components, which can be combined in any suitable fashion. In some further embodiments, the virtual component is custom-designed to serve for the reference dataset 222. In some embodiments, the reference dataset 222 is a point cloud representative of the contour of the virtual component. The reference dataset can be associated with reference inspection results, which catalog various properties of the virtual component, including (but not limited to) the defects of the virtual component, the size and shape of the various features of the virtual component, and the like.

The reference dataset 222 can be provided to the inspection software 214 to validate whether the inspection software 214 is performing adequately, or whether the inspection software 214 is defective. The virtual component, having properties described in the reference dataset 222, can be composed of multiple features, some of which are defects, and others of which are non-defects. Put differently, if the inspection software 214 is functioning properly, the inspection results produced by the inspection software should substantially match the reference inspection results associated with the virtual component. This can include judging some of the features of the virtual component as satisfactory, and judging some others of the features of the virtual component as unsatisfactory. The defects can include variations in the length, width, height, thickness, planarity, angle, and/or curvature of any features of the virtual component. For example, the virtual component is provided with a defect regarding the gap (or distance) between two features of the virtual component. In another example, the virtual component is provided with a defect affecting the size, shape, and/or distance between teeth on a gear. Other examples are also considered.

In some embodiments, the defects present in the virtual component and represented in the reference dataset 222 are randomly selected. For example, properties of the virtual component can be modified in a substantially random fashion, for instance based on established tolerances or the like. In some other embodiments, the defects present in the virtual component and represented in the reference dataset 222 are selected based on the manufacturing process used to produce a physical version of the virtual component, for instance the physical component 205. For example, if the manufacturing process for the physical component 205 is known to produce certain types of defects, the virtual component 205 can be provided with defects mirroring those produced in the physical component 205. In some further embodiments, the defects present in the virtual component are selected based on established standards for physical versions of the virtual component, for instance standards for the physical component 205.

In some embodiments, the database 220 includes multiple reference datasets 222, which can each have different defects and respective associated reference inspection results. Alternatively, or in addition, the database 220 can include one or more reference datasets 222 which include defects, and one or more reference dataset 222 which do not include any defects, i.e., which represent virtual components without any defects, each associated with respective reference inspection results. The different reference datasets 222 can be used in validating different functionality of the inspection software 214, which can be composed of different functions for inspecting different properties of the physical component 205.

The inspection software 214 can be provided with the reference dataset 222, or with more than one reference dataset 222, in order to validate the inspection software 214. The inspection software 214 produces inspection results based on the analysis performed by the inspection software 214, which can include, for example, a list of defects identified in the reference dataset 222. The inspection results produced by the inspection software 214 can then be compared against the reference inspection results associated with the virtual component represented in the reference dataset 222.

Depending on how the inspection results produced by the inspection software 214 compare to the reference inspection results, a determination can be made regarding the inspection software 214 being valid or defective. In some embodiments, the inspection results produced by the inspection software 214 are compared against the reference inspection results, and the differences therebetween are evaluated against a predetermined threshold. The threshold can be an absolute value, for instance based on established regulations, or a relative value, for instance 1%, 2%, 5%, or the like.

For example, if a predetermined number of known defects are absent from the inspection results produced by the inspection software 214, it can be determined that the inspection software 214 is defective. In another example, if particular measurements made by the inspection software 214 differ from corresponding measurements in the reference inspection results by more than a predetermined threshold, it can be determined that the inspection software 214 is defective. Alternatively, in another example, if all, substantially all, or a majority of the known defects are present in the list of defects, and/or if all, substantially all, or a majority of the measurements made by the inspection software 214 match corresponding measurements in the reference inspection results with the predetermined threshold, it can be determined that the inspection software 214 is valid, or valid to a certain degree. The degree to which the known defects are to be present in the list of defects for validation of the inspection software 214 can be set based on any suitable standard, for instance an established regulatory standard. When the inspection software 214 is determined to have been validated, a parameter associated with the inspection software can be set as "valid", or to otherwise indicate that the inspection software 214 has been validated. When the inspection software is determined to be defective, the parameter can be set to "defective", or to otherwise indicate that the inspection software is defective.

In some embodiments, functions of the inspection software 214 which are defective are determined based on the differences between the inspection results produced by the inspection software 214 and the reference inspection results.

For example, defective functions of the inspection software 214 can be determined based on which of the known defects were not found in the list of defects, or which portions of the virtual component were falsely identified as defective. For example, when a known defect related to curvature is not identified by the inspection software 214, the function of the inspection software 214 relating to curvature evaluation is identified as defective. In another example, when the inspection software 214 identifies a defect in a gap between two features of the virtual component which is not a known defect, the function of the inspection software 214 relating to gap evaluation is identified as defective.

The validation of the inspection software 214 can be performed periodically, punctually, or at any other suitable time. In some embodiments, the inspection software 214 is validated every few weeks, months, or years, for instance to account for changes in the operation of the inspection device 212, or for quality assurance purposes. In some other embodiments, the inspection software 214 is validated punctually in response to certain events. For example, the inspection software 214 is validated following an update to the inspection software 214. In another example, the inspection software 214 is validated following installation of the inspection software 214 on a new inspection tool 210.

Figure 3:
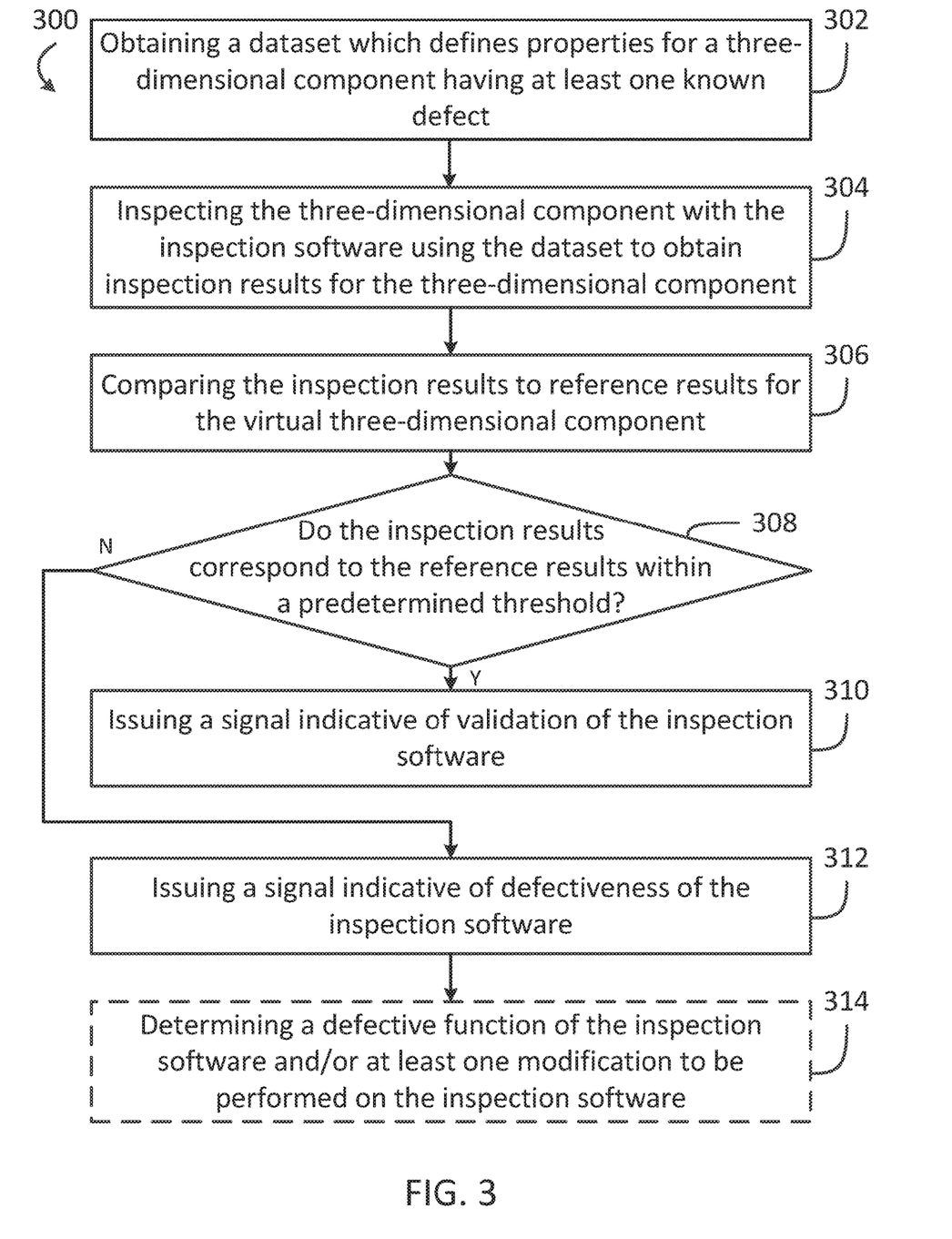
FIG. 3 is a flowchart of an example method for validating an inspection software.

With reference to FIG. 3, a method 300 for validating an inspection software is provided, for instance the inspection software 214. The inspection software 214 can be part of an inspection tool, for instance the inspection tool 210, and be configured to work with an inspection device, for instance the inspection device 212, to perform inspection of physical components, for instance the physical component 205.

At step 302, a dataset is obtained, for instance the reference dataset 222. The reference dataset 222 defines properties for a three-dimensional component which has at least one known defect. The component can be a virtual component, or a representation of a physical component, for instance the physical component 205. The reference dataset 222 can be obtained from any suitable data repository, for instance the database 220. In some embodiments, the reference dataset 222 is one of multiple reference datasets, and more than one reference dataset 222 can be obtained at step 302.

At step 304, the three-dimensional component is inspected with the inspection software 214, using the reference dataset 222, to obtain inspection results for the three-dimensional component. Inspection of the three-dimensional component can include performing one or more predetermined inspection procedures on the three-dimensional component. The inspection procedure can inspect any suitable number of properties of the three-dimensional component, and produces inspection results which can include any suitable information regarding the inspection of the three-dimensional component, including a number of defects, as identified by the inspection software 214. Step 304 can be repeated for multiple reference datasets 222, as appropriate, producing multiple sets of inspection results.

At step 306, the inspection results produced by the inspection software 214 are compared to the reference inspection results for the three-dimensional component. The comparison can be performed in any suitable fashion, using any suitable computing device or the like. The inspection results are compared to the reference inspection results to assess whether the inspection results produced by inspection software 214 correspond to the reference inspection results, for instance within a predetermined threshold. This can include determining whether the inspection software 214 identified the known defects of the three-dimensional component, and/or determining whether the inspection software 214 identified non-defective features of the three-dimensional component as being defective. Alternatively, or in addition, this can include comparing values for various properties of the three-dimensional component as produced by the inspection software 214 and described in the inspection results against corresponding values in the reference inspection results. Step 306 can be repeated for multiple sets of inspection results and reference inspection results, as appropriate.

At decision step 308, a determination is made regarding whether the inspection results produced by the inspection software 214 correspond to the reference inspection results within the predetermined threshold. If the inspection results produced by the inspection software 214 correspond to the reference inspection results within the predetermined threshold, the method 300 proceeds to step 310. If the inspection results produced by the inspection software 214 do not correspond to the reference inspection results within the predetermined threshold, the method 300 proceeds to step 312. For example, the method 300 can proceed to step 312 when the inspection software 214 incorrectly identifies a feature of the three-dimensional component as being defective and/or when the inspection software 214 fails to identify a defect in a feature of the three-dimensional.

At step 310, when the inspection results produced by the inspection software 214 correspond to the reference inspection results within the predetermined threshold, a signal which is indicative of validation of the inspection software 214 is issued. The signal cause a flag or other indicator associated with the inspection software 214, and/or with a function of the inspection software 214, to be set to indicate validation of the inspection software. In some embodiments, the signal sets an indicator associated with the function of the inspection software 214 responsible for detecting certain known defects and/or for evaluating certain properties of the three-dimensional component, based on the reference inspection results. In some embodiments, the indicator is stored in association with the inspection software 214. In other embodiments, the indicator is stored separately from the inspection software 214, for instance in a validation database or the like.

At step 312, when the inspection results produced by the inspection software 214 do not correspond to the reference inspection results within the predetermined, a signal which is indicative of defectiveness of the inspection software 214 is issued. The signal cause a flag or other indicator associated with the inspection software 214, and/or with a function of the inspection software 214, to be set to indicate defectiveness of the inspection software. In some embodiments, the signal sets an indicator associated with the function of the inspection software 214 responsible for detecting certain known defects and/or for evaluating certain properties of the three-dimensional component, based on the reference inspection results. In some embodiments, the indicator is stored in association with the inspection software 214. In other embodiments, the indicator is stored separately from the inspection software 214, for instance in a validation database or the like.

Optionally, at step 314, a defective function of the inspection software 214 is determined. Alternatively, or in addition, a modification to be performed on the inspection software 214 is determined. The determination of the defective function and/or the modification to be performed can be determined based on the particular differences between the inspection results produced by the inspection software 214 and the reference inspection results. For example, the determination of the defective function of the inspection software 214, or of modifications to be performed, can be based on which of the properties of the three-dimensional component were not correctly inspected by the inspection software 214, based on which defects in the three-dimensional component were not identified by the inspection software, and/or based on which portions of the three-dimensional component were falsely identified as defective.

Figure 4:
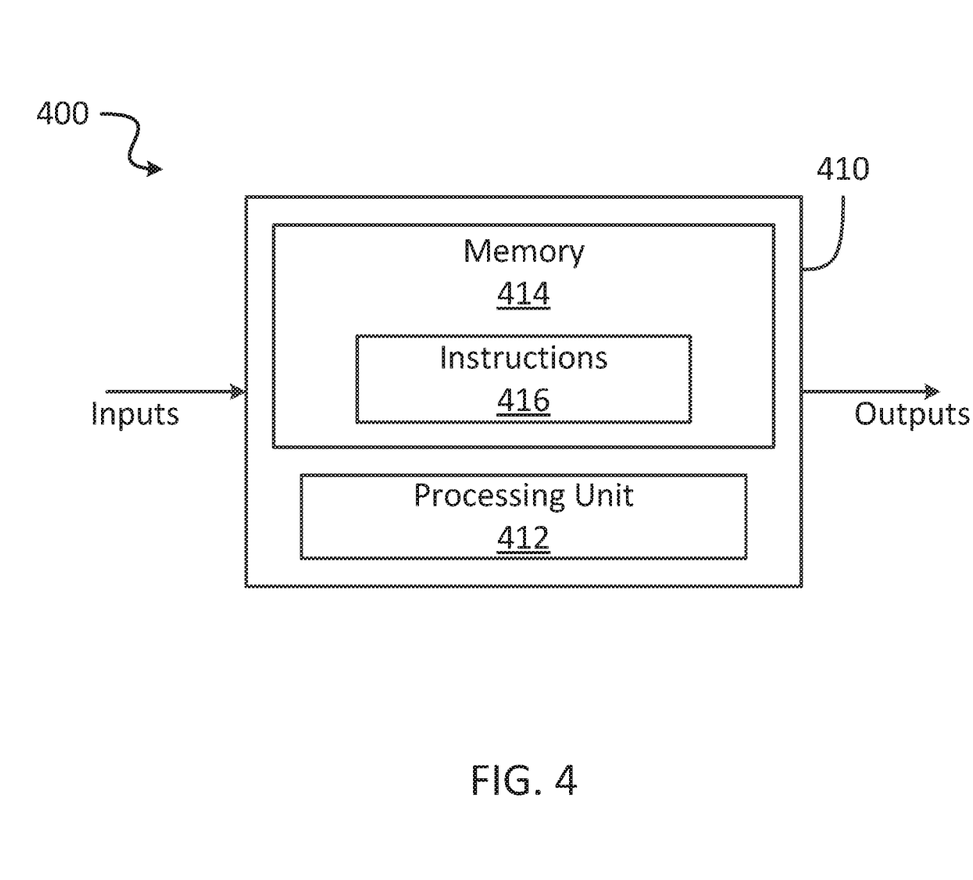
FIG. 4 is a block diagram of an example computing device for implementing the method of FIG. 3.

With reference to FIG. 4, the method 300 may be implemented by a computing device 410, which can embody part or all of the inspection tool 210, for instance the portion which executes the inspection software 214. The computing device 410 comprises a processing unit 412 and a memory 414 which has stored therein computer-executable instructions 416. The processing unit 412 may comprise any suitable devices configured to implement the functionality of the inspection software 214 and/or the functionality described in the method 300, such that instructions 416, when executed by the computing device 410 or other programmable apparatus, may cause the functions/acts/steps performed by the inspection software 214 and/or described in the method 300 as provided herein to be executed. The processing unit 412 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, custom-designed analog and/or digital circuits, or any combination thereof.

The memory 414 may comprise any suitable known or other machine-readable storage medium. The memory 414 may comprise non-transitory computer readable storage medium, for example, but not limited to, an electronic, magnetic, optical, electromagnetic, infrared, or semiconductor system, apparatus, or device, or any suitable combination of the foregoing. The memory 414 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 414 may comprise any storage means (e.g., devices) suitable for retrievably storing machine-readable instructions 416 executable by processing unit 412.

The methods and systems for validating an inspection software as described herein may be implemented in a high level procedural or object oriented programming or scripting language, or a combination thereof, to communicate with or assist in the operation of a computer system, for example the computing device 410. Alternatively, the methods and systems described herein may be implemented in assembly or machine language. The language may be a compiled or interpreted language.

Embodiments of the methods and systems described herein may also be considered to be implemented by way of a non-transitory computer-readable storage medium having a computer program stored thereon. The computer program may comprise computer-readable instructions which cause a computer, or more specifically the processing unit 412 of the computing device 410, to operate in a specific and pre-defined manner to perform the functions described herein, for example those described in the method 300.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the present disclosure. Still other modifications which fall within the scope of the present disclosure will be apparent to those skilled in the art, in light of a review of this disclosure.

Various aspects of the systems and methods described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be apparent to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A method of validating an inspection software following an update to the inspection software, comprising:
   updating the inspection software;
   after updating the inspection software, determining whether the inspection software is performing adequately or whether the inspection software is defective by performing the following:
      obtaining a dataset which defines properties for a first three-dimensional component having at least one known defect, the dataset being associated with reference inspection results cataloging the at least one known defect of the first three-dimensional component, the dataset being a point cloud representative of a contour of the first three-dimensional component;
      inspecting the first three-dimensional component with the inspection software using the dataset and requirements for the first three-dimensional component to obtain validation inspection results for the first three-dimensional component based on the dataset;
      comparing the validation inspection results to the reference inspection results for the first three-dimensional component;
      when the validation inspection results do not correspond to the reference inspection results within a predetermined threshold, setting a parameter associated the inspection software to defective and issuing a signal indicative of defectiveness of the inspection software;
      when the validation inspection results correspond to the reference inspection results within the predetermined threshold:
         determining that the inspection software is performing adequately;
         setting the parameter associated the inspection software to valid;

issuing a signal indicative of the inspection software being validated; and performing inspection of at least one second three-dimensional component of unknown compliance with the requirements using functions of the inspection software as validated;

wherein obtaining the dataset includes generating the dataset by:

obtaining a first dataset which defines first properties for the first three-dimensional component; and varying the first properties of the first dataset to introduce the at least one known defect in the first three-dimensional component.

2. The method of claim 1, further comprising determining a defective function of the inspection software based on differences between the validation inspection results and the reference inspection results.

3. The method of claim 2, further comprising determining at least one modification for the inspection software to correct the defective function.

4. The method of claim 1, further comprising, when the validation inspection results are indicative of a defect not present in the at least one known defect, issuing the signal indicative of defectiveness of the inspection software.

5. The method of claim 1, wherein the at least one known defect is associated with a manufacturing process for producing a physical version of the first three-dimensional component.

6. The method of claim 5, wherein the first dataset is based on a predetermined plan for producing the physical version of the first three-dimensional component.

7. The method of claim 1, wherein the at least one known defect comprises at least one random variation of the first properties.

8. The method of claim 1, wherein the at least one known defect is associated with one or more of a length, a width, a height, a thickness, a planarity, an angle, and a curvature of the first three-dimensional component.

9. A system for validating an inspection software following an update to the inspection software, comprising:

a processing unit; and a non-transitory computer-readable memory communicatively coupled to the processing unit and comprising computer-readable program instructions executable by the processing unit for, after updating the inspection software, determining whether the inspection software is performing adequately or whether the inspection software is defective by performing the following:

obtaining a dataset which defines properties for a first three-dimensional component having at least one known defect, the dataset being associated with reference inspection results cataloging the at least one known defect of the first three-dimensional component, the dataset being a point cloud representative of a contour of the first three-dimensional component;

inspecting the first three-dimensional component with the inspection software using the dataset and requirements for the first three-dimensional component to obtain validation inspection results for the first three-dimensional component based on the dataset;

comparing the validation inspection results to the reference inspection results for the first three-dimensional component;

when the validation inspection results do not correspond to the reference inspection results within a predetermined threshold, setting a parameter associated the inspection software to defective and issuing a signal indicative of defectiveness of the inspection software;

when the validation inspection results correspond to the reference inspection results within the predetermined threshold:

determining that the inspection software is performing adequately;

setting the parameter associated the inspection software to valid;

issuing a signal indicative of the inspection software being validated; and performing inspection of at least one second three-dimensional component of unknown compliance with the requirements using functions of the inspection software as validated;

wherein obtaining the dataset comprises generating the dataset by:

obtaining a first dataset which defines first properties for the first three-dimensional component; and varying the first properties of the first dataset to introduce the at least one known defect in the first three-dimensional component.

10. The system of claim 9, wherein the program instructions are further executable for determining a defective function of the inspection software based on differences between the validation inspection results and the reference inspection results.

11. The system of claim 10, wherein the program instructions are further executable for determining at least one modification for the inspection software to correct the defective function.

12. The system of claim 9, wherein the program instructions are further executable for, when the validation inspection results are indicative of a defect not present in the at least one known defect, issuing the signal indicative of defectiveness of the inspection software.

13. The system of claim 9, wherein the at least one known defect is associated with a manufacturing process for producing a physical version of the first three-dimensional component.

14. The system of claim 13, wherein the first dataset is based on a predetermined plan for producing the physical version of the first three-dimensional component.

15. The system of claim 9, wherein the at least one known defect comprises at least one random variation of the first properties.

16. The system of claim 9, wherein the at least one known defect is associated with one or more of a length, a width, a height, a thickness, a planarity, an angle, and a curvature of the first three-dimensional component.

* * * * *